United States Patent
Lin et al.

(10) Patent No.: US 12,407,264 B2
(45) Date of Patent: Sep. 2, 2025

(54) RESONANT FLYBACK POWER CONVERTER AND SWITCHING CONTROL CIRCUIT AND METHOD THEREOF

(71) Applicant: Richtek Technology Corporation, Hsinchu (TW)

(72) Inventors: Kun-Yu Lin, Hsinchu (TW); Ta-Yung Yang, Hsinchu (TW); Yu-Chang Chen, Hsinchu (TW); Hsin-Yi Wu, Hsinchu (TW); Fu-Ciao Syu, Hsinchu (TW); Chia-Hsien Yang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 380 days.

(21) Appl. No.: 18/298,340

(22) Filed: Apr. 10, 2023

(65) Prior Publication Data
US 2024/0120844 A1   Apr. 11, 2024

Related U.S. Application Data

(60) Provisional application No. 63/379,771, filed on Oct. 17, 2022, provisional application No. 63/379,020, (Continued)

(51) Int. Cl.
*H02M 3/335* (2006.01)
*H02M 1/00* (2006.01)
(Continued)

(52) U.S. Cl.
CPC ..... *H02M 3/33571* (2021.05); *H02M 1/0041* (2021.05); *H02M 1/0058* (2021.05);
(Continued)

(58) Field of Classification Search
CPC ............ H02M 1/0009; H02M 1/0041; H02M 1/0048; H02M 1/0054; H02M 1/0058;
(Continued)

(56) References Cited

U.S. PATENT DOCUMENTS

| 8,174,850 B2 * | 5/2012 | Adragna | H02M 3/33571 363/17 |
| 2011/0085355 A1 * | 4/2011 | Adragna | H02M 3/3376 363/21.03 |
| 2023/0061145 A1 * | 3/2023 | Fu | H02M 3/33576 |

* cited by examiner

*Primary Examiner* — Yemane Mehari
(74) *Attorney, Agent, or Firm* — Huan-Yi Lin

(57) ABSTRACT

A resonant flyback power converter includes: a first and a second transistors which form a half-bridge circuit for switching a transformer and a resonant capacitor to generate an output voltage; a current-sense device for sensing a switching current of the half-bridge circuit to generate a current-sense signal; and a switching control circuit generating a first and a second driving signals for controlling the first and the second transistors. The turn-on of the first driving signal controls the half-bridge circuit to generate a positive current to magnetize the transformer and charge the resonant capacitor. The turn-on of the second driving signal controls the half-bridge circuit to generate a negative current to discharge the resonant capacitor. The switching control circuit turns off the first transistor when the positive current exceeds a positive-over-current threshold, and/or, turns off the second transistor when the negative current exceeds a negative-over-current threshold.

19 Claims, 16 Drawing Sheets

Related U.S. Application Data filed on Oct. 11, 2022, provisional application No. 63/378,765, filed on Oct. 7, 2022.

(51) Int. Cl.
*H02M 1/32* (2007.01)
*H02M 3/00* (2006.01)

(52) U.S. Cl.
CPC ............... *H02M 1/32* (2013.01); *H02M 3/01* (2021.05); *H02M 3/33592* (2013.01); *H02M 1/0009* (2021.05); *H02M 1/0048* (2021.05); *H02M 1/0054* (2021.05)

(58) Field of Classification Search
CPC ...... H02M 1/32; H02M 3/01; H02M 3/33571; H02M 3/33592
USPC ......................................................... 363/21
See application file for complete search history.

RESONANT FLYBACK POWER CONVERTER AND SWITCHING CONTROL CIRCUIT AND METHOD THEREOF

CROSS REFERENCE

The present invention claims priority to following provisional applications, Ser. No. 63/378,765, filed on Oct. 7, 2022; provisional application Ser. No. 63/379,771, filed on Oct. 17, 2022; provisional application Ser. No. 63/379,020, filed on Oct. 11, 2022; all of which applications are incorporated herein by their reference in their entirety.

BACKGROUND OF THE INVENTION

Field of Invention

The present invention relates to a resonant flyback power converter; particularly, it relates to a resonant flyback power converter having high efficiency in light load. The present invention also relates to a resonant flyback power converter having over-current protection. The present invention also relates to switching control circuit and a method for controlling the resonant flyback power converter.

Description of Related Art

FIG. 1 shows a prior art of U.S. Pat. No. 5,959,850 "Asymmetrical Duty Cycle Flyback Converter", which discloses a half-bridge resonant flyback power converter with zero voltage switching (ZVS) for achieving the higher power efficiency. The ZVS can be defined as the transistor is switched on when the voltage across the transistor (e.g. drain-source voltage) is zero or close to zero. However, the drawback of this prior art is that the power efficiency during the light load of the power converter is low.

Another drawback of this prior art is the output voltage of the power converter cannot be variable. More specifically, a ZVS resonant flyback power converter with the variable output voltage requires to detect the demagnetizing time of the transformer for controlling the switching of the transformer.

FIG. 2A and FIG. 2B show waveforms of a prior art half-bridge power converter operating at DCM (discontinuous conduction mode) during the light load condition.

FIG. 2A shows the waveforms of the prior art resonant flyback power converter operated in middle load. During the DCM (discontinuous conduction mode) operation, an off-time period TOFF is started from the turn-off of the second driving signal SL to the next turn-on of the second driving signal SL. The second driving signal SL will turn on again for ZVS of the high-side transistor once the off-time period TOFF is expired. The off-time period TOFF and the period is increased (the switching frequency is decreased) in response to the decrease of the output load for the power saving.

FIG. 2B shows the waveforms of the prior art resonant flyback power converter operated in light load. The pulse width TX of the first driving signal SH is decreased in response to the decrease of the output load of the power converter. The magnetizing current IM is decreased accordantly. However, the pulse width TW of the second driving signal SL remains a fixed minimum SL on-time that is related to the resonant frequency of Lr and Cr, and this is required to discharge the resonant capacitor 20 (Cr). This minimum SL on-time will generate a high circulated current during the period TW' of the second driving signal SL after the magnetizing current IM decreases to zero during TW1, which causes a drawback of high power-loss during the light load.

Compared to the prior art circuits, the present invention provides a resonant flyback power converter with several novel power saving control methods to improve power efficiency for the light load and no-load operations.

In addition, the present invention further provides a switching control circuit having positive and negative over current protection.

SUMMARY OF THE INVENTION

From one perspective, the present invention provides a resonant flyback power converter, including: a first transistor and a second transistor which are configured to form a half-bridge circuit; a current-sense device, coupled to the half-bridge circuit and configured to sense a primary switching current of the half-bridge circuit to generate a current-sense signal; a transformer and a resonant capacitor which are connected in series and are coupled to the half-bridge circuit; and a switching control circuit configured to operably generate a first driving signal and a second driving signal to control the first transistor and the second transistor respectively for switching the transformer and the resonant capacitor to generate an output voltage; wherein during a turn-on period of the first driving signal, the switching control circuit controls the half-bridge circuit to generate a positive current of the primary switching current to magnetize the transformer and charge the resonant capacitor; wherein during a turn-on period of the second driving signal, the switching control circuit controls the half-bridge circuit to generate a negative current of the primary switching current to discharge the resonant capacitor; wherein the switching control circuit senses the current-sense signal to turn off the first transistor when a level of the positive current exceeds a positive-over-current threshold, and/or, to turn off the second transistor when a level of the negative current exceeds a negative-over-current threshold.

From another perspective, the present invention provides a switching control circuit, configured to operably control a resonant flyback power converter, wherein the resonant flyback power converter includes a first transistor and a second transistor which are configured to form a half-bridge circuit; a current-sense device, coupled to the half-bridge circuit and configured to sense a primary switching current of the half-bridge circuit to generate a current-sense signal; and a transformer and a resonant capacitor which are connected in series and are coupled to the half-bridge circuit, wherein the first transistor and the second transistor are configured to switch the transformer and the resonant capacitor to generate an output voltage; wherein the switching control circuit includes: a magnetizing control circuit, configured to operably generate a first driving signal to switch the first transistor; and a resonant and ZVS control circuit, coupled to the magnetizing control circuit and configured to operably generate a second driving signal to switch the second transistor; wherein during a turn-on period of the first driving signal, the switching control circuit controls the half-bridge circuit to generate a positive current of the primary switching current to magnetize the transformer and charge the resonant capacitor; wherein during a turn-on period of the second driving signal, the switching control circuit controls the half-bridge circuit to generate a negative current of the primary switching current to discharge the resonant capacitor; wherein the switching control circuit senses the current-sense signal to turn off the first transistor when a level of the positive current exceeds a positive-over-current threshold, and/or, to turn off the second transistor when a level of the negative current exceeds a negative-over-current threshold.

From still another perspective, the present invention provides a method, configured to operably control a resonant flyback power converter, wherein the resonant flyback power converter includes a first transistor and a second transistor which are configured to form a half-bridge circuit; a current-sense device, coupled to the half-bridge circuit and configured to sense a primary switching current of the half-bridge circuit to generate a current-sense signal; and a transformer and a resonant capacitor which are connected in series and are coupled to the half-bridge circuit, wherein the first transistor and the second transistor are configured to switch the transformer and the resonant capacitor to generate an output voltage; wherein the method includes: generating a first driving signal to switch the first transistor; and generating a second driving signal to switch the second transistor; wherein during a turn-on period of the first driving signal, the switching control circuit controls the half-bridge circuit to generate a positive current of the primary switching current to magnetize the transformer and charge the resonant capacitor; wherein during a turn-on period of the second driving signal, the switching control circuit controls the half-bridge circuit to generate a negative current of the primary switching current to discharge the resonant capacitor; wherein the switching control circuit senses the current-sense signal to turn off the first transistor when a level of the positive current exceeds a positive-over-current threshold, and/or, to turn off the second transistor when a level of the negative current exceeds a negative-over-current threshold.

In one embodiment, both the first driving signal and the second driving signal are turned off for an off-time period when the level of the negative current exceeds the negative-over-current threshold.

In one embodiment, the current-sense device is a current-sense resistor; the current-sense resistor is configured to sense the level of the positive current and the level of the negative current.

In one embodiment, the positive current and the negative current are in inverse polarity.

In one embodiment, the second driving signal includes a minimum resonant period during a resonant cycle of the resonant flyback power converter; the minimum resonant period is decreased in response to the decrease of an output load, wherein the resonant cycle is related to a resonance of the resonant capacitor and the transformer.

In one embodiment, the resonant flyback power converter or the switching control circuit further includes a bias resistor; the bias resistor is coupled to the current-sense device for generating a current-sense signal; wherein the current-sense signal is configured to be compared with a first current threshold voltage for determining whether the positive current exceeds the positive-over-current threshold, and/or, to be compared with a second current threshold voltage for determining whether the negative current exceeds the negative-over-current threshold.

In one embodiment, during a DCM operation, the second driving signal further includes an off-time period which is started after the transformer is demagnetized; wherein the off-time period is increased in response to the decrease of an output load; wherein the first driving signal and the second driving signal are turned off during the off-time period.

In one embodiment, a pulse width of the second driving signal is decreased in response to the decrease of an output load.

In one embodiment, during a DCM operation, the second driving signal further includes an off-time period which is started from the turn-off of the second driving signal; wherein the off-time period is increased in response to the decrease of an output load; wherein the first driving signal and the second driving signal are turned off during the off-time period.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
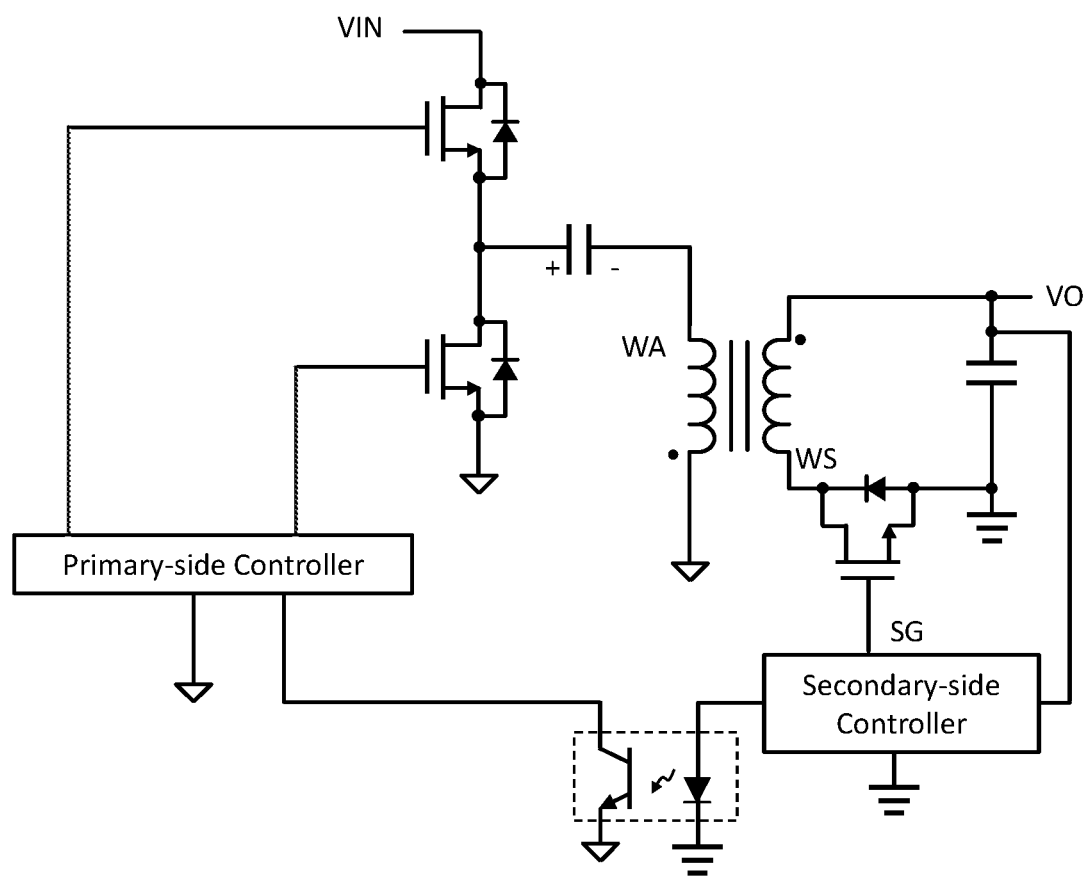
FIG. 1 shows a prior art flyback converter.
Figure 2A:
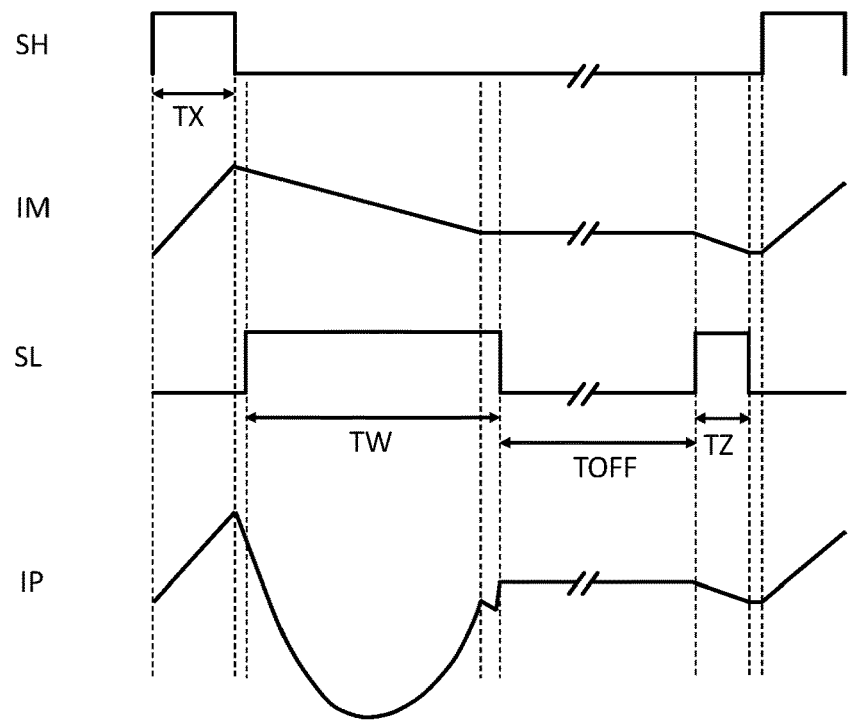
FIGS. 2A and 2B show waveforms of a prior art half-bridge power converter operating at DCM (discontinuous conduction mode) during the light load condition.
Figure 2B:
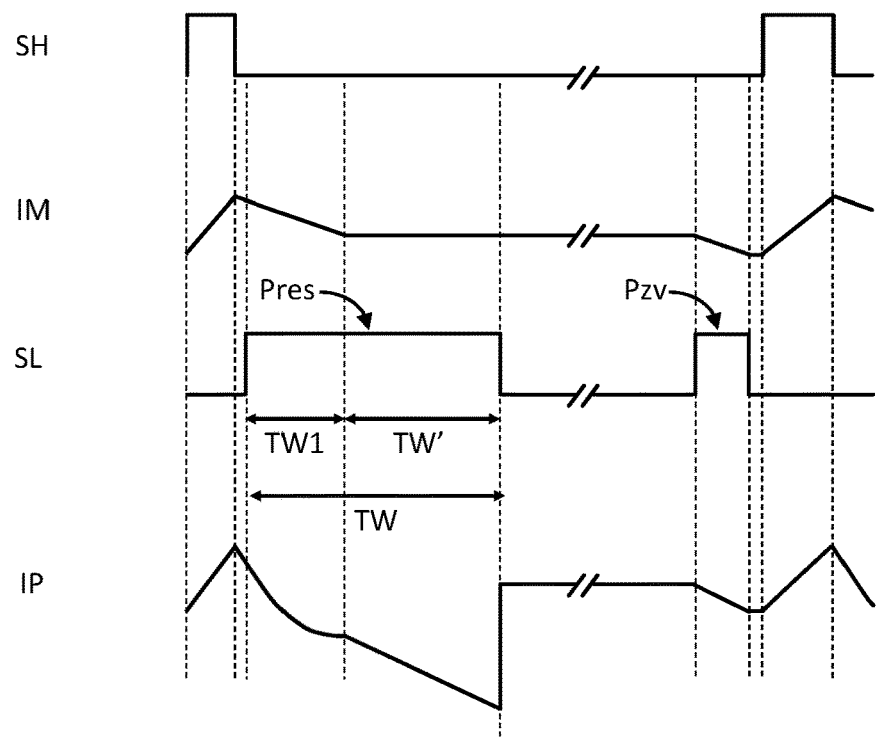
Figure 3:
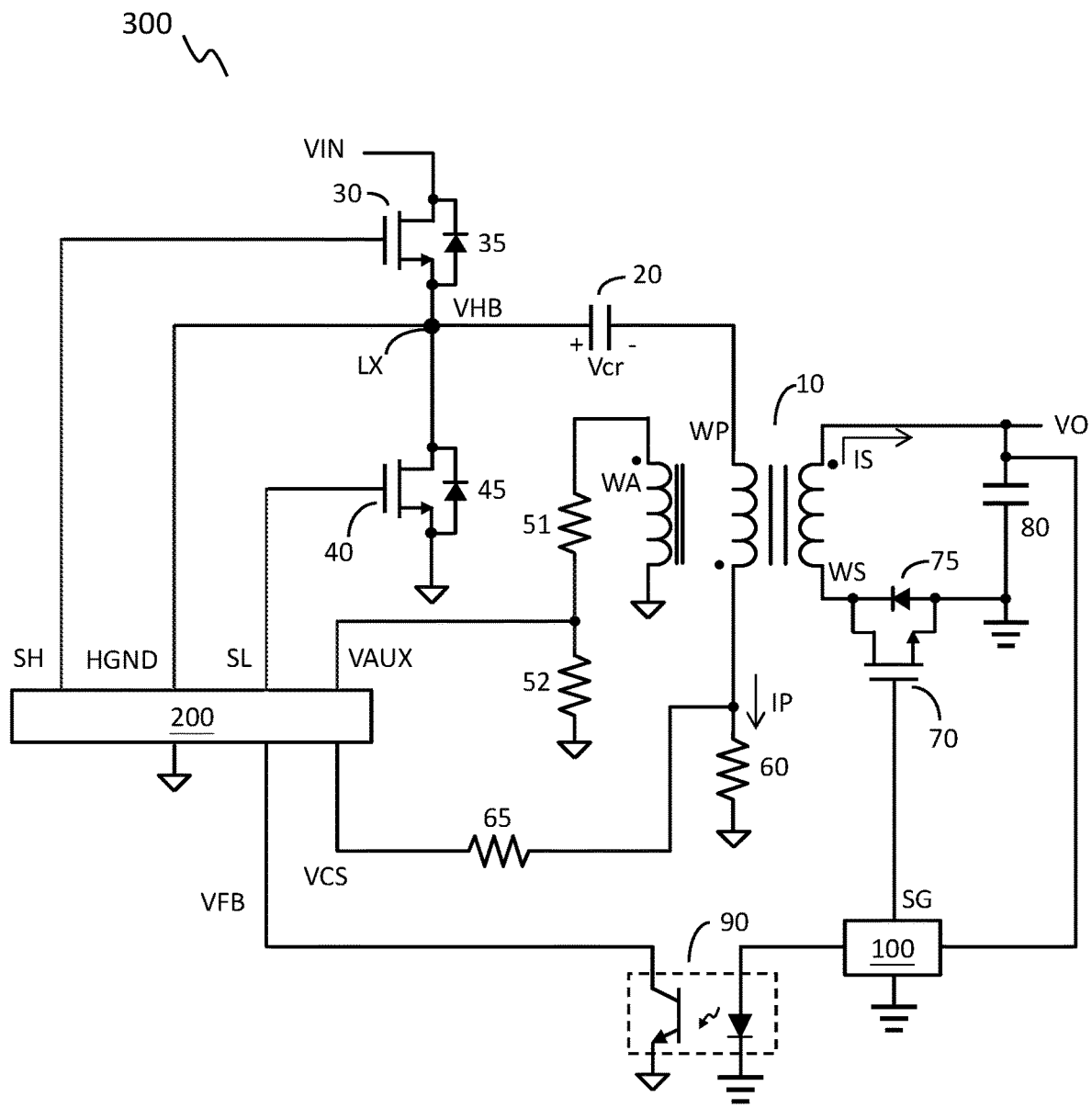
FIG. 3 shows a schematic diagram of a preferred embodiment of a resonant flyback power converter according to the present invention.

FIG. 3 shows a schematic diagram of a preferred embodiment of a resonant flyback power converter according to the present invention. The resonant half-bridge flyback power converter 300 includes a first transistor 30 and a second transistor 40 which form a half-bridge circuit. A transformer 10 and a resonant capacitor 20 connected in series is coupled to the switching node LX of the half-bridge circuit. The transformer 10 includes a primary winding WP, a secondary winding WS and an auxiliary winding WA. The primary winding WP and the secondary winding WS have a turn ratio n=Np/Ns. The auxiliary winding WA and the secondary winding WS have a turn ratio m=Na/Ns. The auxiliary winding WA and the primary winding WP have a turn ratio k=Na/Np. Note that Np, Ns and Na are numbers of turns of the primary winding WP, the secondary winding WS and the auxiliary winding WA respectively.

A primary-side controller 200 generates a first driving signal SH and a second driving signal SL coupled to switch the transformer 10 through the half-bridge circuit for generating an output voltage VO at the secondary-side of the transformer 10. The first driving signal SH drives the first transistor 30 to magnetize the transformer 10. The second driving signal SL turns on the second transistor 40 during demagnetizing and the resonant period of the transformer 10. The second driving signal SL also is applied to turn on the second transistor 40 for generating a circulating current through the transformer 10 and achieving ZVS for the first transistor 30. A resistor 60 is coupled to generate a current-sense signal VCS by detecting a primary switching current IP of the power transformer 10.

The first driving signal SH and the second driving signal SL are generated in response to a feedback signal VFB according to the output power (e.g. output voltage VO) of the resonant flyback power converter 300. A secondary controller 100 is coupled to the output voltage VO for generating the feedback signal VFB. In one embodiment, the feedback signal VFB is coupled from the secondary controller 100 to the primary-side controller 200 through an opto-coupler 90. The secondary controller 100 also generates a driving signal SG for driving the synchronous rectifier 70 during the demagnetizing period TDS of the transformer 10. The auxiliary winding WA generates an auxiliary winding signal VNA during the switching of the transformer 10. Resistors 51, 52 further attenuate the auxiliary winding signal VNA for producing an auxiliary signal VAUX coupled to the primary-side controller 200.

Figure 4:
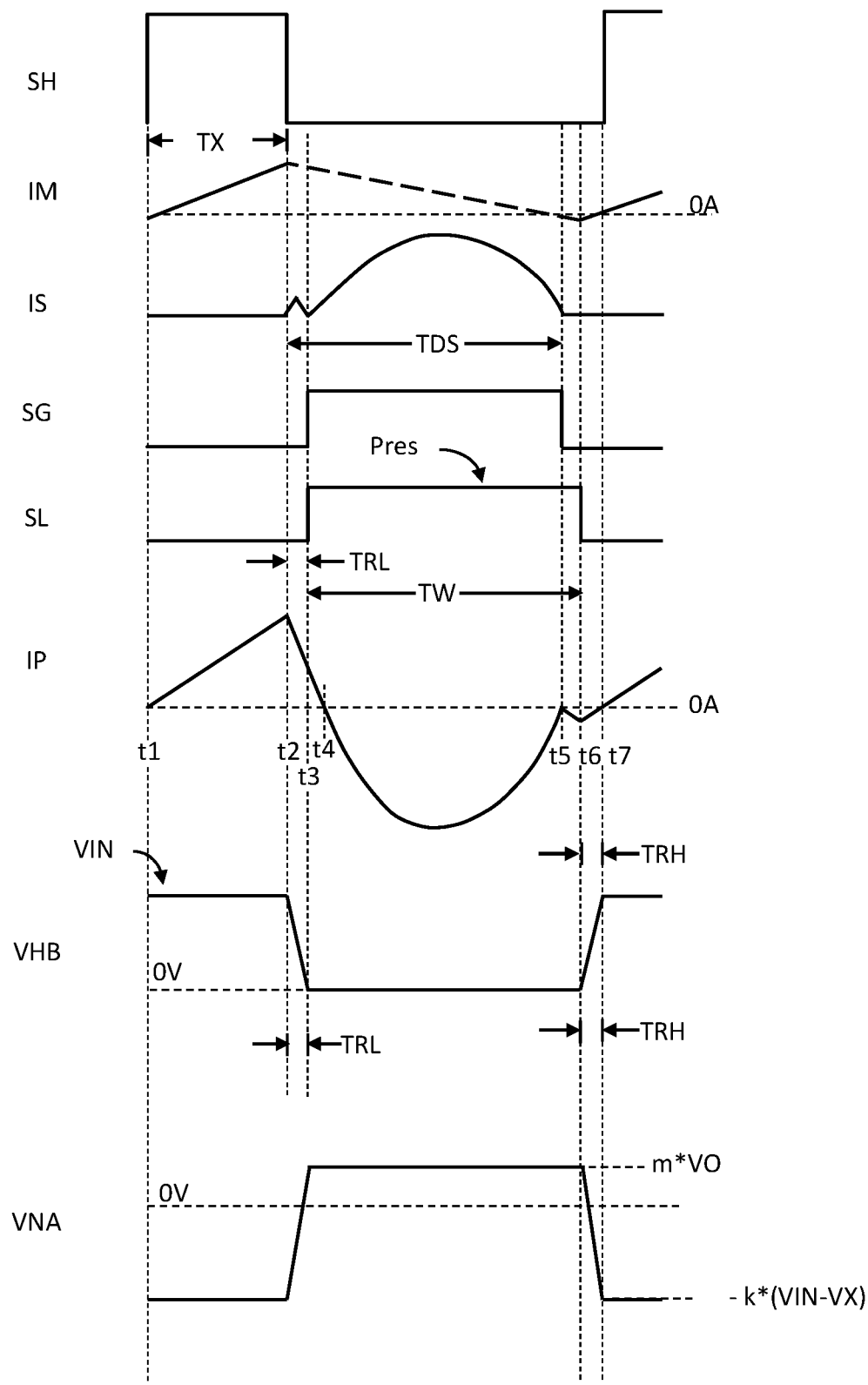
FIG. 4 shows operating waveforms corresponding to the resonant flyback power converter shown in FIG. 3 according to the present invention.

FIG. 4 shows operating waveforms corresponding to the embodiment shown in FIG. 3. The transformer 10 is magnetized and a magnetizing current IM is generated when the first driving signal SH is turned on (i.e. enabled to for example a high state). The transformer 10 is demagnetized when the first driving signal SH is turned off (i.e. disabled to for example a low state). The transformer 10 generates a secondary switching current IS during the demagnetizing period TDS. The resonant pulse width TW of a resonant pulse Pres of the second driving signal SL is related to the demagnetizing period TDS of the transformer 10. In one embodiment, the resonant pulse width TW of the second driving signal SL is configured to be equal to or longer than the demagnetizing period TDS of the transformer 10 to prevent the transformer 10 from operating in continuous conduction mode (CCM). A reflected voltage VX is generated in the resonant capacitor 20 during the demagnetizing period TDS of the transformer 10, wherein VX=VO*Np/Ns.

The second driving signal SL can be turned on when the first driving signal SH is turned off. The first driving signal SH can be turned on when the second driving signal SL is turned off. Dead time periods (e.g. TRH and TRL) can be included in between the first driving signal SH and the second driving signal SL.

Operations during different time periods shown in FIG. 4 are explained in the following sections.

The period from t1 to t2 indicates a magnetized transformer cycle. The first transistor 30 is on and the second transistor 40 is off. The current IP increases in the transformer 10 and the voltage in the resonant capacitor 20 increases. The transformer 10 is magnetized and the resonant capacitor 20 is charged. The secondary synchronous rectifier 70 is off and the body diode 75 of the secondary synchronous rectifier 70 is biased inversely. Hence no energy is transferred to the secondary side.

The period from t2 to t3 indicates a first circulated current cycle. Both the first transistor 30 and the second transistor 40 are off. The circulated current of the transformer 10 will force the switching node voltage VHB of the half-bridge circuit to drop until the body diode 45 of the second transistor 40 is turned on. The time period from t2 to t3 is related to a quasi-resonant period for achieving ZVS of the second transistor 40. The primary side of the transformer 10 now has the same voltage as the resonant capacitor 20 at t3.

The period from t3 to t4 indicates a resonant cycle (positive current). The first transistor 30 is off and the second transistor 40 is turned on under the ZVS condition. The output voltage VO equals to the voltage Vcr across the resonant capacitor 20 divided by the turn ratio n. The current starts flowing through the secondary synchronous rectifier 70, the energy stored in the transformer 10 is transferred to the output to generate the output voltage VO. Because the LC tank is formed by the leakage inductance Lr of the transformer 10 and the resonant capacitor 20 (Cr), the secondary current follows a sine-wave with the period determined by the resonant frequency of Lr and Cr. The current in the primary side of the transformer 10 is the sum of the magnetizing current IM and the reflected secondary current IS. The current in the resonant tank (Lr, Cr) is still positive, mainly driven from the magnetizing inductance of the transformer 10, and flows into the resonant capacitor 20.

The period from t4 to t5 indicates a resonant cycle (negative current). The first transistor 30 is off and the second transistor 40 is turned on continuously. The energy is still being transferred to the secondary side, but the resonant tank current is inversely driven by the voltage in the resonant capacitor 20. The energy of the resonant capacitor 20 is not only transferred to the secondary side, but also utilized to bring the magnetizing current of the transformer 10 to a negative level when the second transistor 40 is continuously turned on (e.g. t4-t5).

The period from t5 to t6 indicates a backward magnetized transformer cycle (negative current). The backward magnetized transformer cycle is started from the end of demagnetizing period TDS of the transformer 10 to the second transistor 40 is off. The resonant capacitor 20 will inversely magnetize the transformer 10 and generate the negative current.

The period from t6 to t7 indicates a second circulated current cycle. Both the first transistor 30 and the second transistor 40 are off. The negative current induced in the transformer 10 during t5 to t6 forces the voltage VHB at the switching node LX of the half-bridge circuit to increase until it turns on the body diode 35 of the first transistor 30. Therefore, the first transistor 30 can achieve ZVS when turned on again at t7.

After the time point t7, another cycle starts similar with t1 to t2, wherein the first transistor 30 is turned on with the ZVS condition and the second transistor 40 is off. If the circulated current in the transformer resonant tank is still negative, the excess of energy in the tank will be sent back to the input VIN.

Figure 5A:
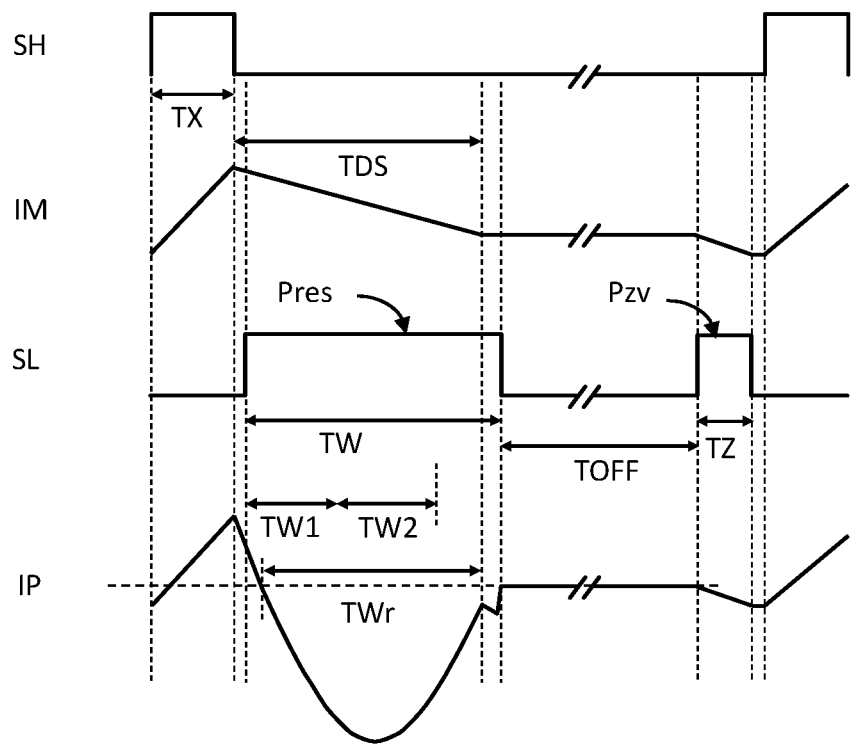
FIG. 5A and FIG. 5B show waveforms of a preferred embodiment of the resonant flyback power converter operated in middle load and light load respectively according to the present invention.
Figure 5B:
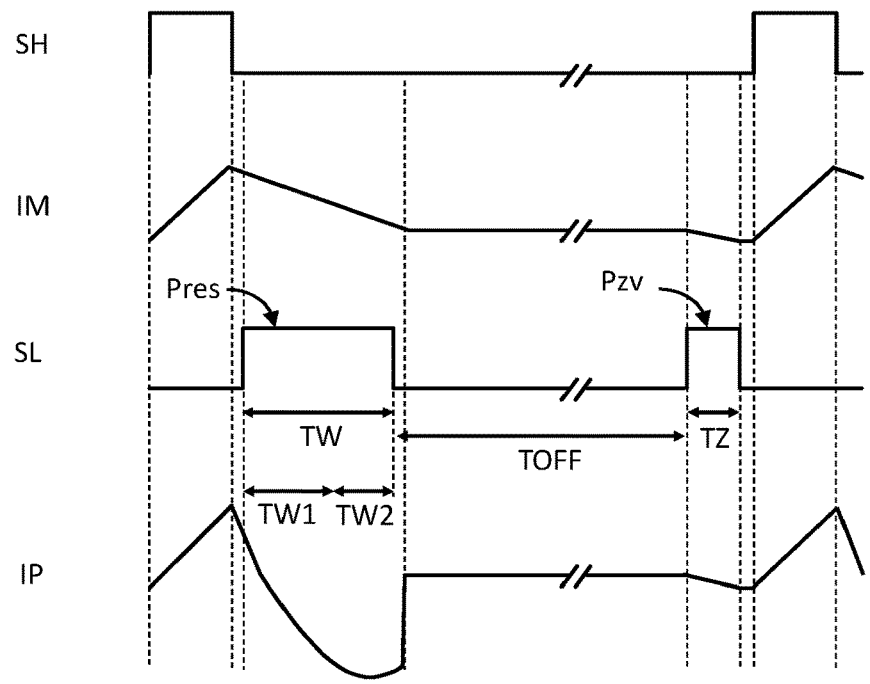

FIG. 5A and FIG. 5B show waveforms of a preferred embodiment of the resonant flyback power converter operated in middle load and light load respectively according to the present invention. Referring to FIG. 5A, an off-time period TOFF is started from the turn-off of the second driving signal SL to the next turn-on of the second driving signal SL. The second driving signal SL will turn on once a timer 350 (shown in FIG. 8) is expired. In one embodiment, the off-time period TOFF and the period of the timer 350 is increased (the switching frequency is decreased) in response to the decrease of the output load for the power saving, wherein the output load is coupled to and consumes the output power. In one embodiment, during a middle load condition as shown in FIG. 5A, the demagnetizing period TDS is close to the resonant period TWr, and the resonant pulse width TW of the second driving signal SL is close to both the demagnetizing period TDS and the resonant period TWr. Note that the demagnetizing period TDS is the time period of the magnetizing current IM falling from the peak to 0. The resonant period TWr is the resonant period of the resonant capacitor 20 and the leakage inductance Lr of the transformer 10 plus the time period of the primary switching current IP falling from the peak to 0. The resonant pulse width TW is a time period of the first pulse (i.e. the resonant pulse Pres) of the second driving signal SL after the first driving signal SH turning off.

In one embodiment, as shown in FIG. 5A, the resonant pulse width TW of the second driving signal SL has a minimum resonant period Tres_min which is equal to the sum of a fixed minimum resonant sub-period TW1 and an adjustable minimum resonant sub-period TW2. In this embodiment in FIG. 5A, since the output load is during a middle range, the resonant pulse width TW is not limited by the minimum resonant period Tres_min.

In one embodiment, the adjustable minimum resonant sub-period TW2 is decreased in response to the decrease of the output load. Therefore, the minimum resonant period Tres_min is also decreased in response to the decrease of the output load.

Referring to FIG. 5B, in one embodiment, during a light output load condition, the resonant pulse width TW is limited by the minimum resonant period Tres_min. In this embodiment as shown in FIG. 5B, the adjustable minimum resonant sub-period TW2 is adjusted to be shorter than that in FIG. 5A due to lower output load condition (e.g. lower output load power or lower output load current). Thus, the resonant pulse width TW in FIG. 5B is shorter, and is short to an extent that the circulated current (i.e. the negative current of the primary switching IP) is reduced or that the time period of the circulated current is reduced, compared to FIG. 5A.

From one perspective, the minimum resonant period Tres_min of the second driving signal SL of this embodiment will not generate the circulated current, or will simply generate a very low circulated current after the magnetizing current IM decreases to zero, which significantly reduces the power-loss during the light load.

Figure 5C:
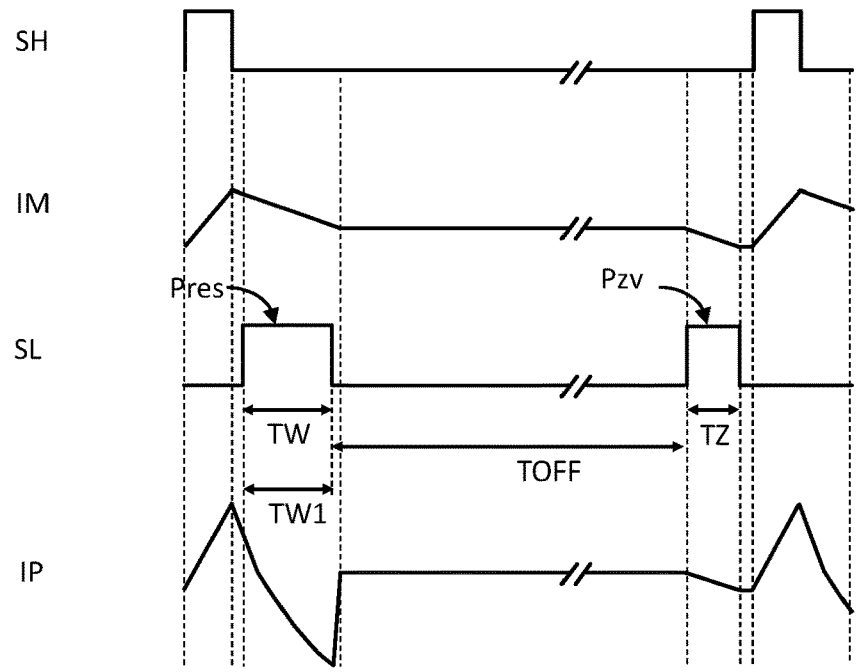
FIG. 5C shows waveforms of a preferred embodiment of the resonant flyback power converter operated in a very light load or no output load according to the present invention.

Referring to FIG. 5C, in one embodiment, during a very light output load or no output load condition, the resonant pulse width TW is limited by the minimum resonant period Tres_min. In this embodiment as shown in FIG. 5C, the adjustable minimum resonant sub-period TW2 is adjusted to be 0 as the output load further decreases. Thus, the resonant pulse width TW in FIG. 5C is equal to the fixed minimum resonant sub-period TW1.

From one perspective, a first minimum resonant period Tres_min1 during a higher output load condition is Tres_min1=TW1+TW2, wherein the TW2 is non-zero, is longer than a second minimum resonant period Tres_min2 during a lower output load condition is Tres_min2=TW1+0 when TW2 is zero.

Figure 6A:
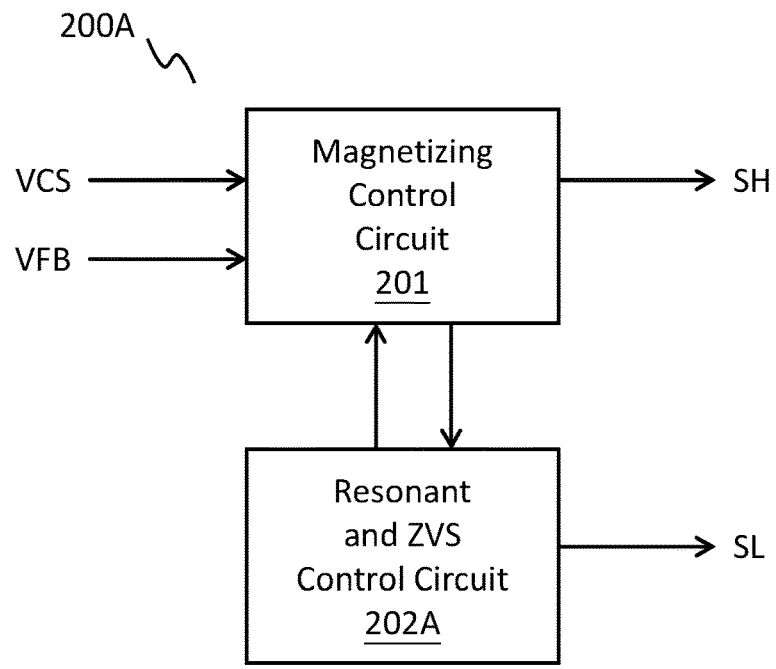
FIG. 6A and FIG. 6B show block diagrams of two preferred embodiments of the primary-side controller (200A, 200B) of the resonant flyback power converter according to the present invention.
Figure 6B:
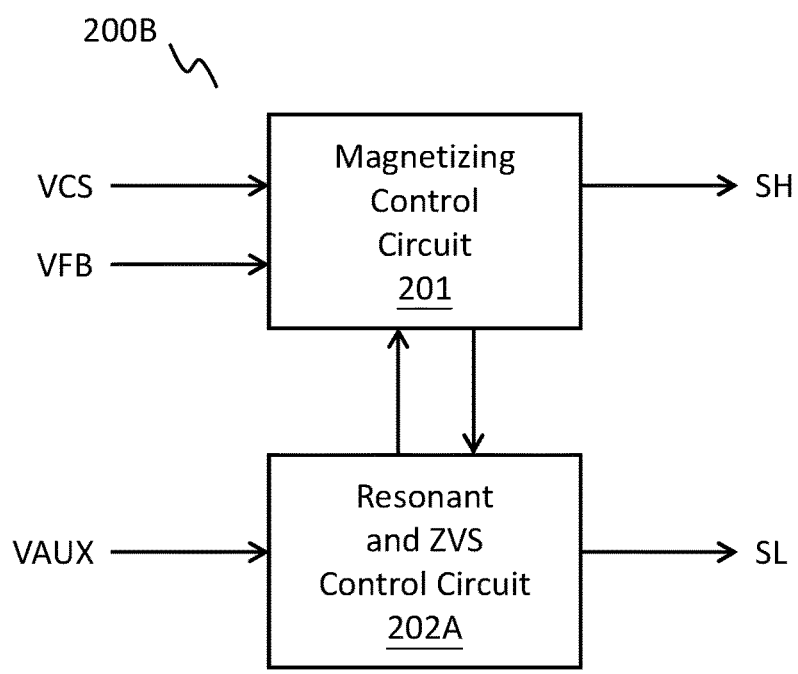

FIG. 6A and FIG. 6B show block diagrams of two preferred embodiments of the primary-side controller (200A, 200B) of the resonant flyback power converter according to the present invention. In one embodiment, as shown in FIG. 6A, the primary-side controller 200A includes a magnetizing control circuit 201 and a resonant and ZVS control circuit 202A. The magnetizing control circuit 201 is configured to generate the first driving signal SH according to the current-sense signal VCS, the feedback signal VFB and signals generated by the resonant and ZVS control circuit 202A. The resonant and ZVS control circuit 202A is configured to generate the second driving signal SL according to signals generated by the magnetizing control circuit 201. In one embodiment, as shown in FIG. 6B, the primary-side controller 200B includes a magnetizing control circuit 201 and a resonant and ZVS control circuit 202B. In one embodiment, the resonant and ZVS control circuit 202B is configured to generate the second driving signal SL further according to the auxiliary signal VAUX.

Figure 7:
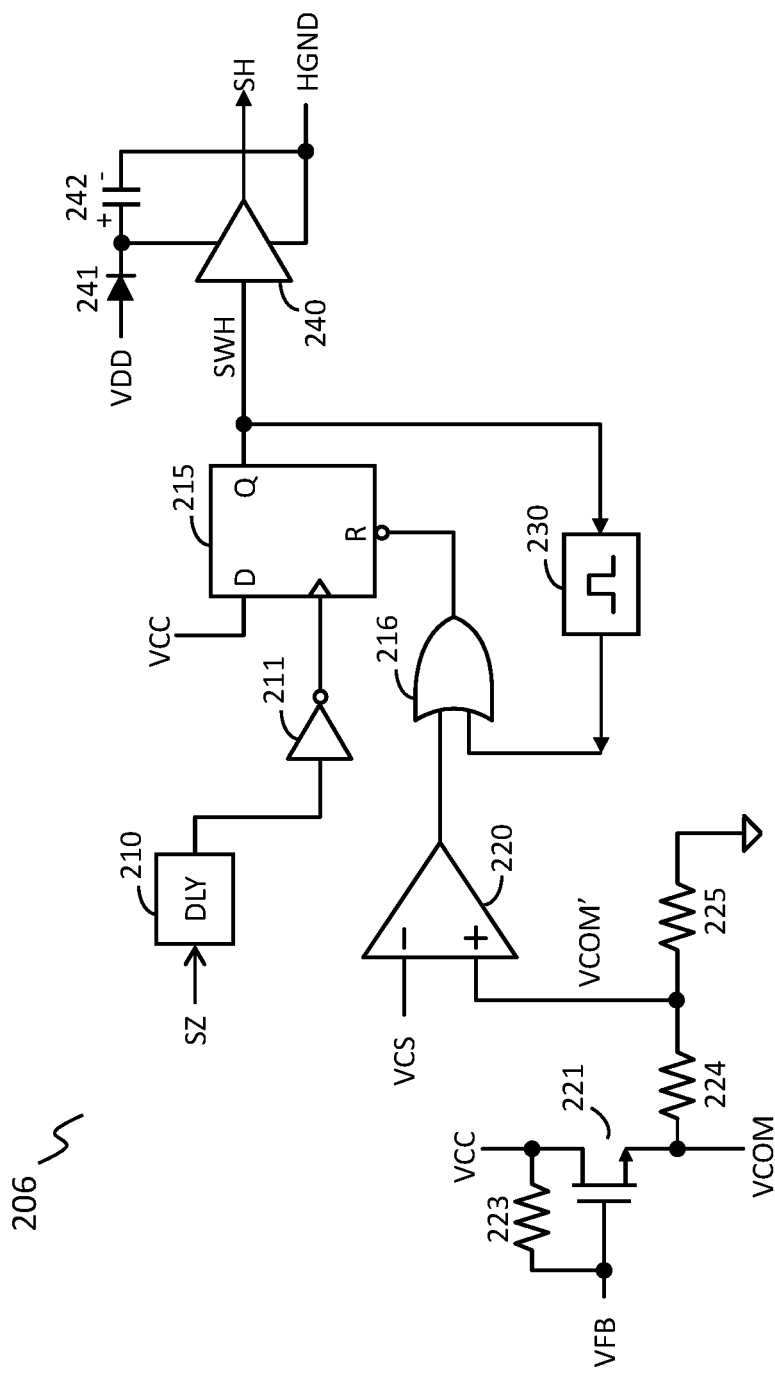
FIG. 7 shows a schematic diagram of a preferred embodiment of a magnetizing control circuit of the resonant flyback power converter according to the present invention.

FIG. 7 shows a schematic diagram of a preferred embodiment of a magnetizing control circuit 206, for generating the first driving signal SH, of the resonant flyback power converter according to the present invention. The feedback signal VCOM is a level-shifted signal of the feedback signal VFB via a transistor 221. In one embodiment, the level of the feedback signal VFB is proportional to the level of the output load of the resonant flyback power converter. The falling edge of a ZVS control signal SZ enables a flip-flop 215 and the first driving signal SH after a delay time provided by a delay cell 210, wherein the generation of the ZVS control signal SZ will be explained in detail later. In one embodiment, the delay time provided by the delay cell 210 is related to a quasi-resonant delay for ZVS, wherein the quasi-resonant delay is related to the resonant period of the magnetizing inductance of the primary winding WP and the total equivalent parasitic capacitance on the switching node LX. A pulse generator 230 determines a minimum on-time of the first driving signal SH once the first driving signal SH is turned on. Resistors 224, 225 generates an attenuated feedback signal VCOM'. A comparator 220 resets the flip-flop 215 and is configured to turn off the first driving signal SH when the current-sense signal VCS is higher than the attenuated feedback signal VCOM'. The output of the flip-flop 215 (i.e. the first switching control signal SWH) generates the first driving signal SH through the high-side gate driver 240. The bootstrap capacitor 242 and a bootstrap diode 241 are configured to provide the power source for the high-side gate driver 240.

Figure 8:
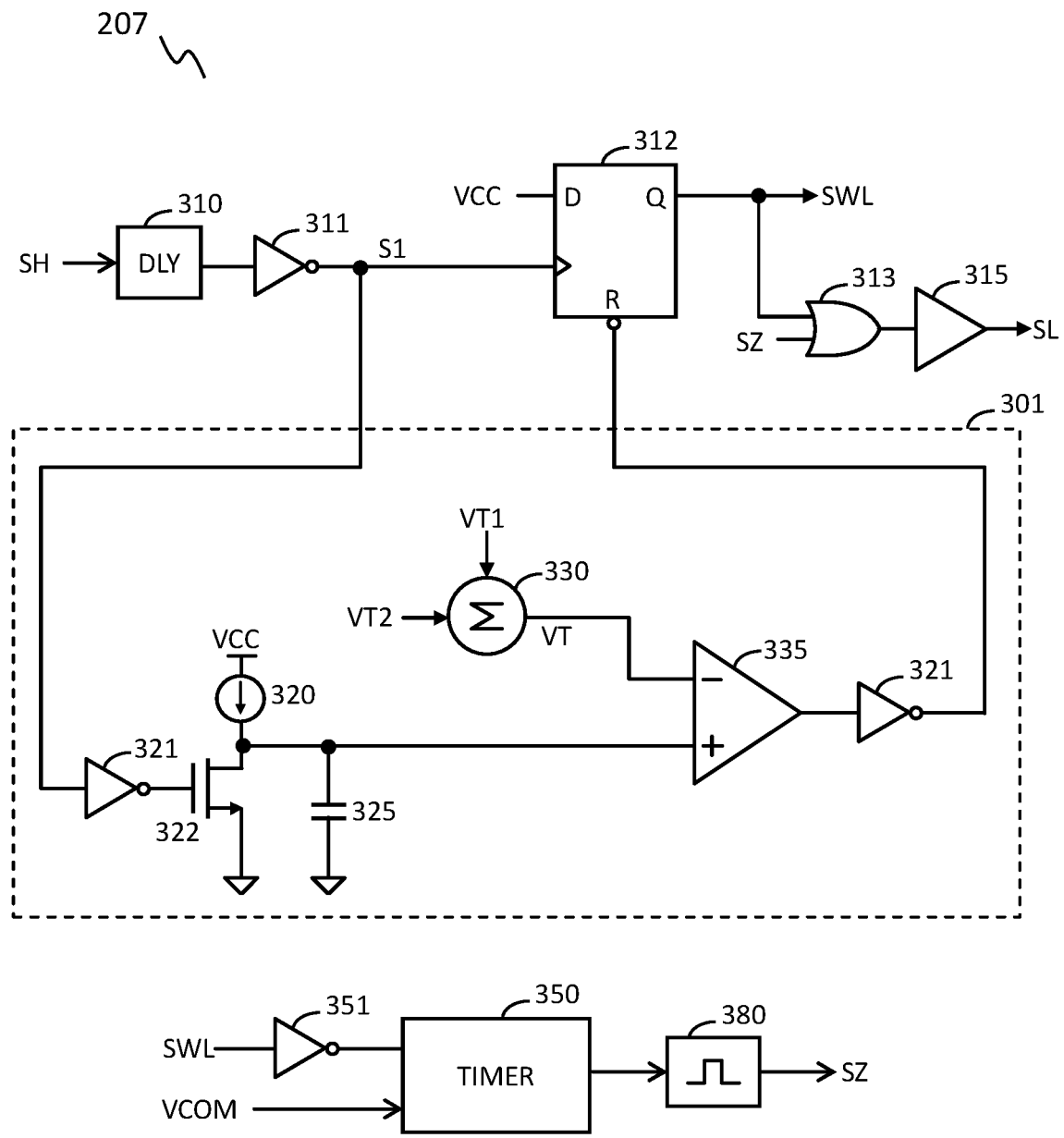
FIG. 8 shows a schematic diagram of a preferred embodiment of a resonant and ZVS control circuit of the resonant flyback power converter according to the present invention.

FIG. 8 shows a schematic diagram of a preferred embodiment of a resonant and ZVS control circuit 207 of the resonant flyback power converter according to the present invention. The second driving signal SL is determined by a second switching control signal SWL and the ZVS control signal SZ via an OR gate 313 and buffered by a driver 315. The falling edge of the first driving signal SH triggers a flip-flop 312 to enable the second switching control signal SWL after a quasi-resonant delay provided by a delay-time cell 310. In a preferred embodiment, the delay-time cell 310 is configured to provide a quasi-resonant delay for ZVS of the second transistor 40. A current source 320, a capacitor 325, a transistor 322, an inverter 321 and a comparator 335 are configured to form a timer circuit 301. When the first driving signal SH becomes logic-low, the capacitor 325 starts to be charged by the current source 320. Once the voltage level of capacitor 325 is higher than a threshold voltage VT, the comparator 335 generates a reset signal to reset the flip-flop 312 and turns off the second switching control signal SWL, for turning off the second transistor 40. The pulse width of the second switching control signal SWL is thus determined by the voltage level of the threshold voltage VT. The voltage level of the threshold voltage VT is determined by a threshold VT1 and a threshold VT2 via an adder 330 (VT=VT1+VT2). The threshold VT1 corresponds to the determination of the fixed minimum resonant sub-period TW1 and the threshold VT2 corresponds to the determination of the adjustable minimum resonant sub-period TW2. In one embodiment, the threshold VT2 is correlated to the feedback signal VCOM, such that the voltage level of the threshold VT2 is decreased in response to the decrease of the output load. The voltage level of the threshold VT1 is a constant value that provides the fixed minimum resonant sub-period TW1 of the second switching control signal SWL for discharging the resonant capacitor 20 during the light load.

Note that, in one embodiment, the threshold VT2 is not correlated to the output load until the output load is lower than a predetermined threshold. In other words, in one embodiment, the minimum resonant period Tres_min is fixed when the output load is higher than the predetermined threshold.

Still referring to FIG. 8, the turn-off of the second switching control signal SWL starts the timer 350. The feedback signal VCOM determines an off-time period TOFF of the timer 350. In one embodiment, the off-time period TOFF is inverse proportional to the feedback signal VCOM and thus is increased in response to the decrease of the output load. Once the timer 350 is expired, the timer 350 enables a pulse generator 380 to generate the ZVS control signal SZ. During the DCM (discontinuous conduction mode) operation, the ZVS control signal SZ is utilized to generate a circulated current for achieving the ZVS of the first transistor 30. The pulse width of the ZVS control signal SZ, referred to as the ZVS pulse width TZ, is determined by the voltage level of the input voltage VIN and the output voltage VO and the inductance of the transformer 10, etc.

In summary, the second driving signal SL includes a resonant pulse Pres which has a resonant pulse width TW determined by the second switching control signal SWL and a ZVS pulse Pzv which has a ZVS pulse width TZ determined by the ZVS control signal SZ during the DCM operation. The resonant pulse width TW has a first minimum resonant period Tres_min1=(TW1+TW2) for the high output load and a second minimum resonant period Tres_min2=(TW1) for the light output load, wherein the second minimum resonant period (TW1) is shorter than the first minimum resonant period (TW1+TW2). In one embodiment, the first minimum resonant period (TW1+TW2) is decreased in response to the decrease of the output load.

Figure 9A:
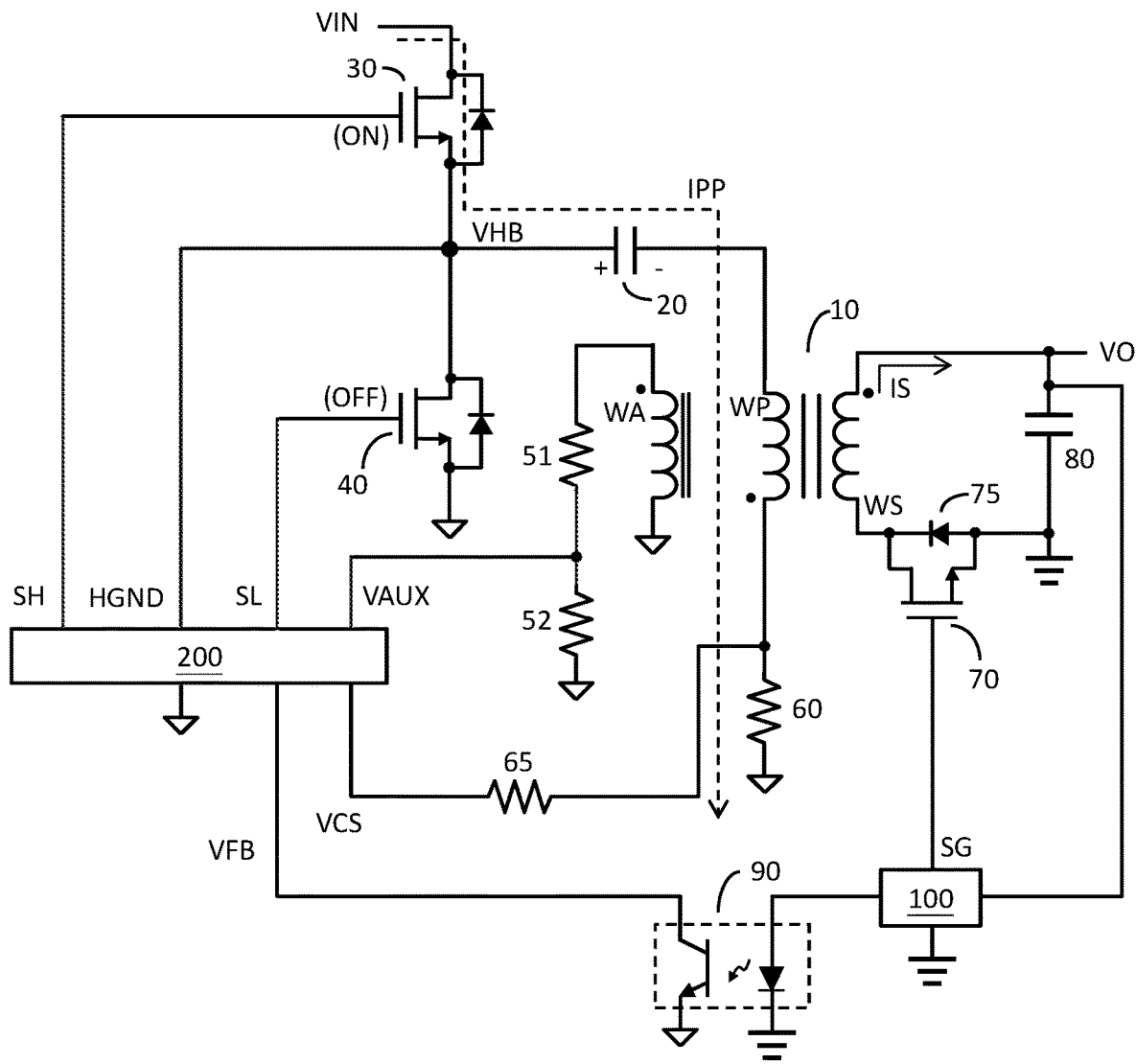
FIG. 9A shows a schematic diagram of a preferred embodiment of a resonant flyback power converter operated in the magnetized transformer cycle with a positive primary switching current according to the present invention.

FIG. 9A shows a schematic diagram of a preferred embodiment of the resonant flyback power converter operated in the magnetized transformer cycle with a positive primary switching current according to the present invention. FIG. 9A shows the positive current IPP which is the positive portion of the primary switching current IP. The positive current IPP is generated when the first transistor 30 is turned on and the second transistor 40 is off, and the power converter is operated in the magnetized transformer cycle (positive current IPP, corresponding to the period of "t1 to t2" of FIG. 4). The positive current IPP will magnetize the transformer 10 and charge the resonant capacitor 20. If the output of the resonant flyback power converter is short-circuited at this moment, the magnetic-flux of the transformer 10 will saturate after a few switching cycles, and the primary winding WP of the transformer 10 will be equivalently short-circuited, which can cause a permanent damage to the first transistor 30. Therefore, an over-current protection is required to turn off the first transistor 30 immediately for protecting the first transistor 30 when the positive current IPP of the primary switching current IP exceeds a positive-over-current threshold.

Figure 9B:
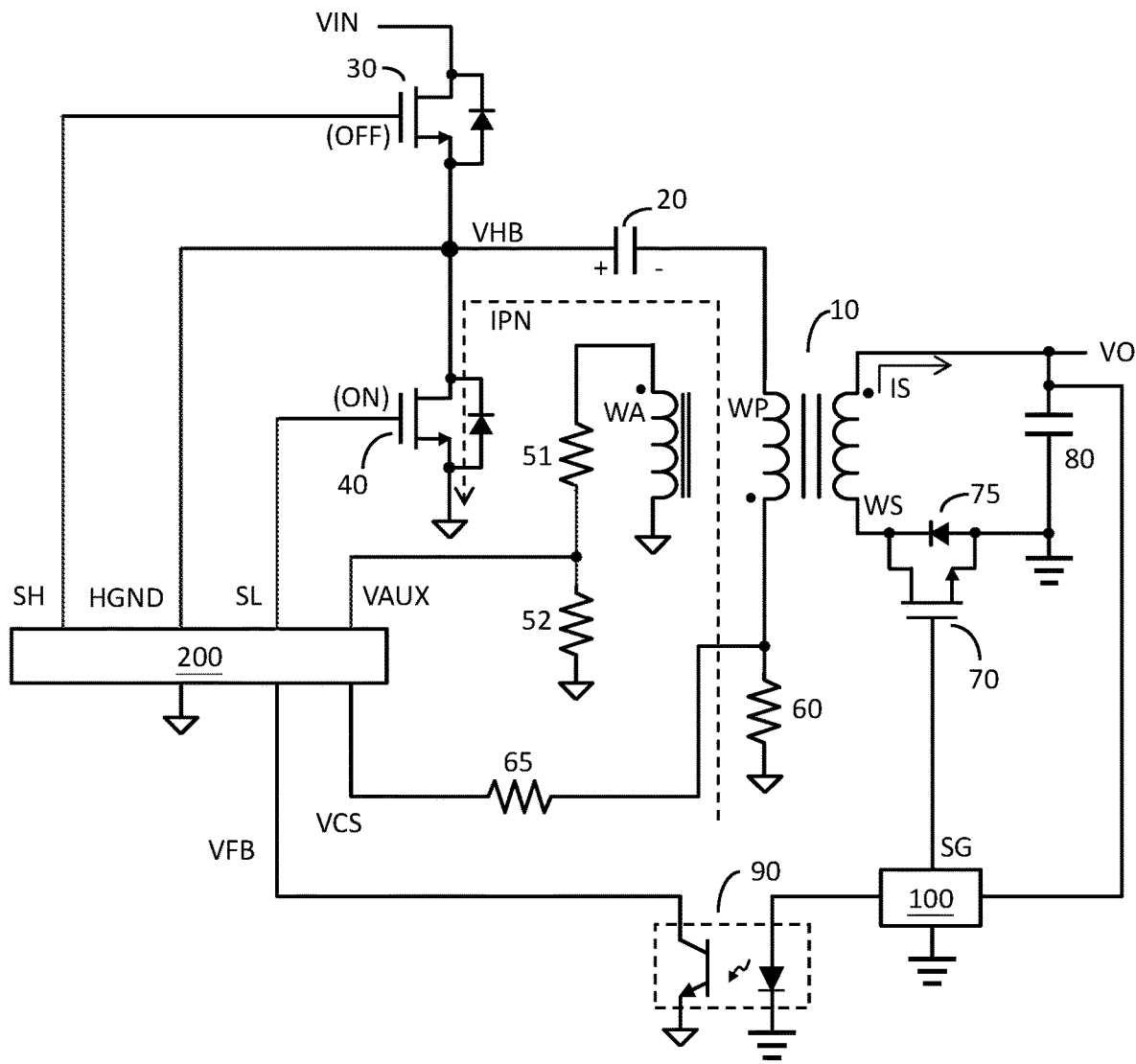
FIG. 9B shows a schematic diagram of a preferred embodiment of a resonant flyback power converter operated in the resonant cycle with a negative primary switching current according to the present invention.

FIG. 9B shows a schematic diagram of a preferred embodiment of the resonant flyback power converter operated in the resonant cycle with a negative primary switching current according to the present invention. FIG. 9B shows the negative current IPN which is the negative portion of the primary switching current IP. The negative current IPN is generated when the first transistor 30 is off and the second transistor 40 is turned on, and the power converter is operated in the resonant cycle (negative current, corresponding to the period of "t4 to t5" of FIG. 4). The energy of the resonant capacitor 20 is transferred to the output of the resonant flyback power converter through the transformer 10. If the output of the resonant flyback power converter is short-circuited at this moment, the resonant capacitor 20 will be equivalently short-circuited through the transformer 10, which can cause a permanent damage to the second transistor 40. Therefore, an over-current protection is needed to turn off the second transistor 40 immediately for protecting the second transistor 40 when the negative current IPN exceeds a negative-over-current threshold.

Figure 10:
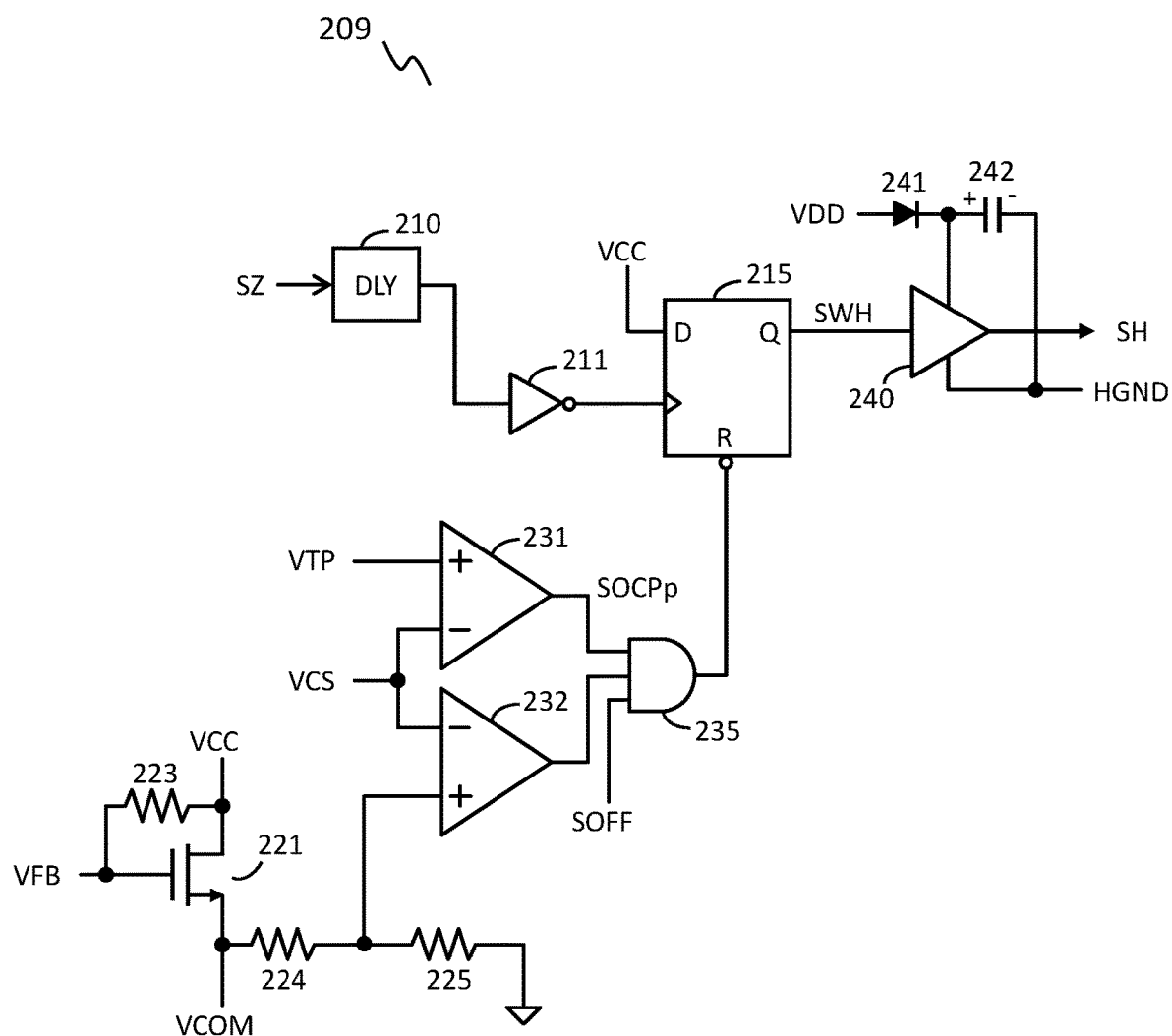
FIG. 10 shows a schematic diagram of a preferred embodiment of a magnetizing control circuit of the resonant flyback power converter according to the present invention.

FIG. 10 shows a schematic diagram of a preferred embodiment of a magnetizing control circuit 209, for generating the first driving signal SH, of the resonant flyback power converter according to the present invention. The magnetizing control circuit 209 is similar to the magnetizing control circuit 206 and is different in that the magnetizing control circuit 209 further includes a comparator 231, and an AND gate 235 for replacing the OR gate 216. The comparator 231 will generate a positive-over-current protection signal SOCPp to reset the flip-flop 215 and turn off the first driving signal SH through the AND gate 235 when the level of the current-sense signal VCS exceeds the first current threshold voltage VTP.

Figure 11:
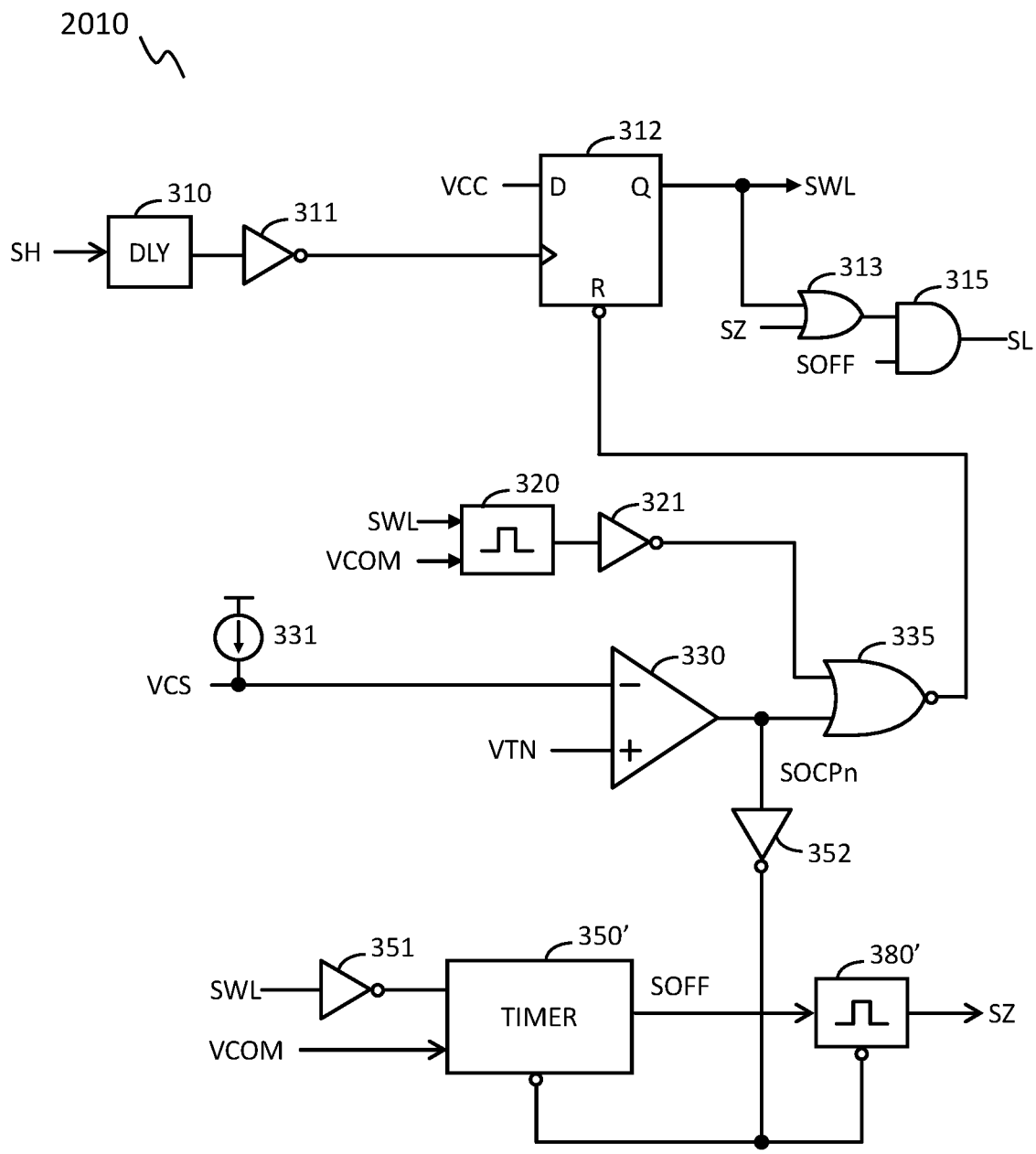
FIG. 11 shows a schematic diagram of a preferred embodiment of a resonant and ZVS control circuit of the resonant flyback power converter according to the present invention.

FIG. 11 shows a schematic diagram of a preferred embodiment of a resonant and ZVS control circuit 2010, for generating the second driving signal SL, of the resonant flyback power converter according to the present invention. The second driving signal SL is formed by a second switching control signal SWL (with the resonant pulse width TW) and a ZVS control signal SZ (with a ZVS pulse width TZ). The second driving signal SL is generated via an OR gate 313 and an AND gate 315 which are configured for processing the signals SWL, SZ and SOFF. Note that the signal SOFF generated by the timer 350 is configured to represent the aforementioned off-time period TOFF as shown in FIG. 5A to FIG. 5C and to assure both the first driving signal SH (FIG. 10) and the second driving signal SL (FIG. 11) are off during the off-time period TOFF.

Still referring to FIG. 11, The falling edge of the first driving signal SH triggers a flip-flop 312 to enable the second switching control signal SWL after a quasi-resonant delay provided by a delay-time cell 310. In a preferred embodiment, the delay-time cell 310 is configured to provide a quasi-resonant delay for ZVS of the second transistor 40. Once the second switching control signal SWL is enabled, a pulse generator 320 determines the pulse width of the second switching control signal SWL (i.e. the resonant pulse width TW) according to the level of the feedback signal VCOM. The pulse width of the second switching control signal SWL is decreased in response to the decrease of the output load. The end of the pulse of the pulse generator 320 will generate a reset signal to reset the flip-flop 312 and turn off the second switching control signal SWL, which corresponds to the starting of the aforementioned off-time period TOFF. A current source 331 associated with the resistor 65 (e.g. FIG. 9B) provide a bias voltage to the current-sense signal VCS. A comparator 330 is coupled to receive the current-sense signal VCS and generate a negative-over-current protection signal SOCPn when the level of the current-sense signal VCS exceeds the second current threshold voltage VTN. The negative-over-current protection signal SOCPn is coupled to reset the flip-flop 312, the timer 350' and the pulse generator 380', which assures to the turn-off of the second driving signal SL through the AND gate 315 for the negative-over-current protection.

The turn-off of the second switching control signal SWL (e.g. low state) starts the timer 350 and generate the off-time signal SOFF (a low-true signal). In one preferred embodiment, the off-time period TOFF of the timer 350' is inverse proportional to the level of the feedback signal VCOM. During the DCM operation, the off-time period TOFF is increased (such that the switching frequency is decreased) in response to the decrease of the output load. Once the timer 350' is expired, the timer 350' enables the pulse generator 380' to generate the ZVS control signal SZ. During the heavy load, the off-time period TOFF of the timer 350' is zero. A predetermined off-time period is generated when the timer 350' is reset by the negative over-current protection signal SOCPn. During the DCM operation, the ZVS control signal SZ is utilized to generate a circulated current for achieving the ZVS of the first transistor 30.

Referring back to FIG. 5B, in one embodiment, the pulse width TX of the first driving signal SH is decreased in response to the decrease of the output load. The pulse width TW of the second driving signal SL is also decreased according to the decrease of the pulse width TX of the first driving signal SH. However, the second driving signal SL still has a minimum on-time that is needed to discharge the resonant capacitor 20. In one embodiment, for both the middle load and the light load operations, the second driving signal SL (the second switching control signal SWL or the ZVS control signal SZ) is turned off as long as the current-sense signal VCS exceeds the second current threshold voltage VTN. The first driving signal SH and the second driving signal SL is also turned off for a predetermined off-time period when the level of the negative current IPN exceeds the negative-over-current threshold.

In summary, the first driving signal SH and the second driving signal SL are coupled to switch the first transistor 30 and the second transistor 40 respectively. The first transistor 30 and the second transistor 40 develop the half-bridge circuit coupled to switch the transformer 10 through the resonant capacitor 20 and the current-sense device 60 for generating the output voltage VO. The turn-on of the first driving signal SH generates the positive current IPP of the primary switching current IP to magnetize the transformer 10 and charge the resonant capacitor 20. The turn-on of the second driving signal SL generates the negative current IPN of the primary switching current IP to discharge the resonant capacitor 20. The first transistor 30 is turned off once the level of the positive current IPP exceeds the positive-over-current threshold. The second transistor 40 is turned off once the level of the negative current IPN exceeds the negative-over-current threshold. In one embodiment, the current-sense device 60 is a current-sense resistor. The current-sense resistor is coupled to detect the level of the positive current IPP and the level of the negative current IPN of the primary switching current IP. The positive current IPP and the negative current IPN are in inverse polarity. The resistor 65 and the current source 331 are coupled to the current-sense device 60 for generating the current-sense signal VCS. The current-sense signal VCS is further coupled to be compared with the first current threshold voltage VTP and the second current threshold voltage VTN.

Figure 12:
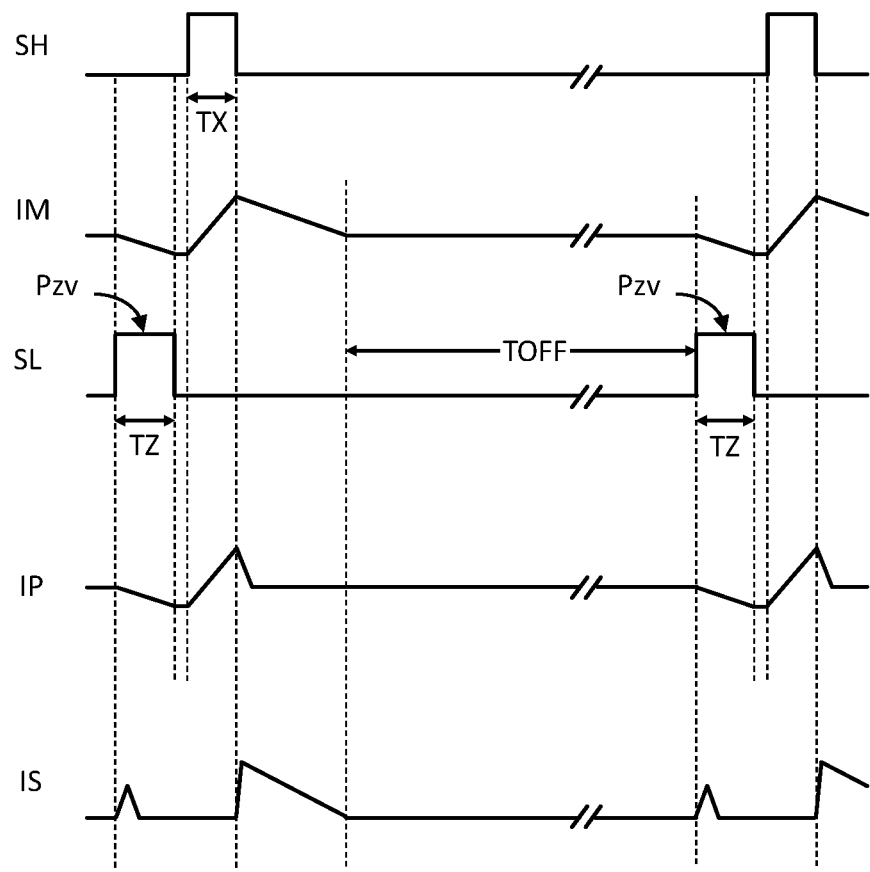
FIG. 12 shows operating waveforms corresponding to a preferred embodiment of the resonant flyback power converter according to the present invention.

FIG. 12 shows operating waveforms corresponding to a preferred embodiment of the resonant flyback power converter operated in light load and at low output voltage according to the present invention. In one embodiment, when the output voltage VO is lower than a low-voltage threshold, the second driving signal SL is controlled to skip the aforementioned resonant pulse Pres of the second driving signal SL. In other words, the resonant flyback power converter will be operated in non-resonant flyback mode, or in an asynchronous mode, for further saving power in light load.

Figure 13:
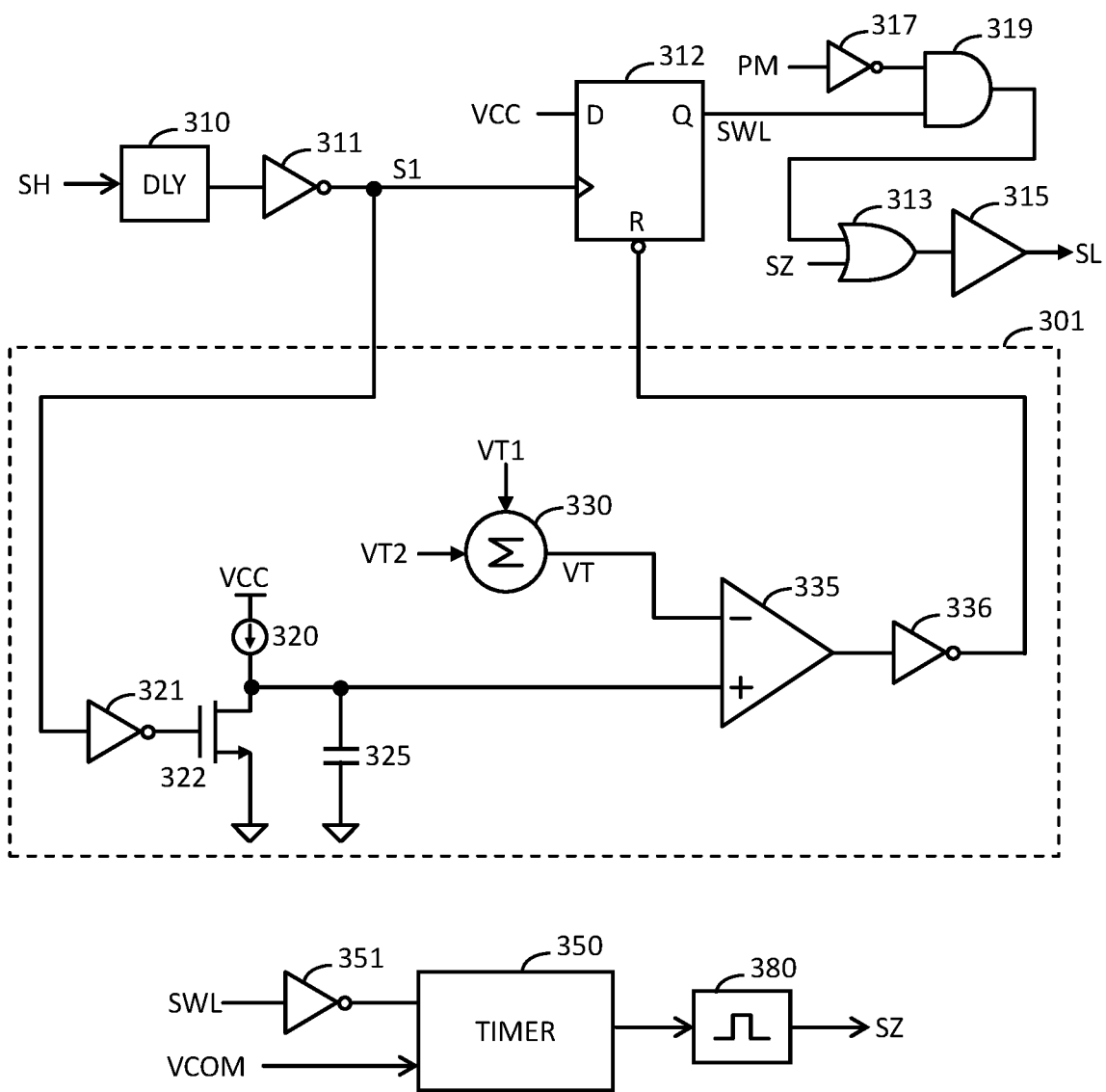
FIG. 13 shows a schematic diagram of a preferred embodiment of a resonant and ZVS control circuit of the resonant flyback power converter according to the present invention.

FIG. 13 shows a schematic diagram of a preferred embodiment of a resonant and ZVS control circuit 2012 of the resonant flyback power converter according to the present invention. The resonant and ZVS control circuit 2012 is similar to the resonant and ZVS control circuit 207 and is different in that the second driving signal SL is further determined according to a power indicating signal PM.

In one embodiment, the second driving signal SL is formed by a second switching control signal SWL and the ZVS control signal SZ, and the second driving signal SL is generated via an AND gate 319, an OR gate 313 and a driver 315. The generation of a power indicating signal PM is configured to mask the second switching control signal SWL in the second driving signal SL. In one embodiment, the power indicating signal PM is generated once the output voltage VO is lower than a low-voltage threshold.

In one embodiment, the output voltage VO lower than the low-voltage threshold indicates a lighter output load condition when the resonant flyback power converter is compliant with for example USB PD (Universal Serial Bus Power Delivery) specification. Therefore, when the second switching control signal SWL is further controlled to be masked so that the second driving signal SL is off when the output voltage VO is lower than the low-voltage threshold, the power converter is operated in asynchronous mode and is more power-saving.

Figure 14:
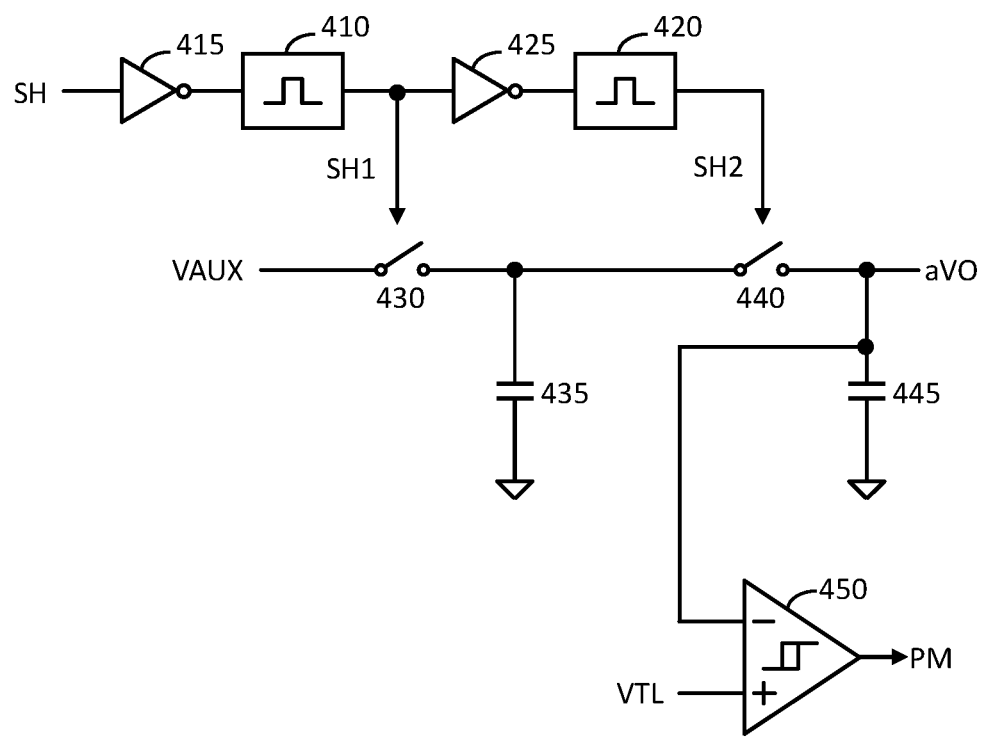
FIG. 14 shows a schematic diagram of a preferred embodiment of a power indicating circuit of the resonant flyback power converter according to the present invention.

FIG. 14 shows a schematic diagram of a preferred embodiment of a power indicating circuit, for generating the power indicating signal PM of the resonant flyback power converter according to the present invention. A reflected output voltage a*VO is generated by sample-and-holding the voltage of the auxiliary signal VAUX. The coefficient a is expressed as below:

$$a = (R52/(R51+R52))*m$$

A pulse generator 410 generates a first sample signal SH1 in response to the falling edge of the first driving signal SH. The first sample signal SH1 is configured to sample-and-hold the voltage of the auxiliary signal VAUX into a capacitor 435. A pulse generator 420 further generates a second sample signal SH2 in response to the end of the first sample signal SH1. The second sample signal SH2 is configured to sample-and-hold the voltage of the capacitor 435 into a capacitor 445 for generating the reflected output voltage a*VO. The voltage level of reflected output voltage a*VO is related to the voltage level of the output voltage VO. Once the voltage level of the reflected output voltage a*VO is lower than a low-voltage threshold VTL, the power indicating signal PM is generated by a comparator 450.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant flyback power converter, comprising:
   a first transistor and a second transistor which are configured to form a half-bridge circuit;
   a current-sense device, coupled to the half-bridge circuit and configured to sense a primary switching current of the half-bridge circuit to generate a current-sense signal;
   a transformer and a resonant capacitor which are connected in series and are coupled to the half-bridge circuit; and
   a switching control circuit configured to operably generate a first driving signal and a second driving signal to control the first transistor and the second transistor respectively for switching the transformer and the resonant capacitor to generate an output voltage;
   wherein during a turn-on period of the first driving signal, the switching control circuit controls the half-bridge circuit to generate a positive current of the primary switching current to magnetize the transformer and charge the resonant capacitor;
   wherein during a turn-on period of the second driving signal, the switching control circuit controls the half-bridge circuit to generate a negative current of the primary switching current to discharge the resonant capacitor;
   wherein the switching control circuit senses the current-sense signal to turn off the first transistor when a level of the positive current exceeds a positive-over-current threshold, and/or, to turn off the second transistor when a level of the negative current exceeds a negative-over-current threshold.

2. The resonant flyback power converter as claimed in claim 1, wherein both the first driving signal and the second driving signal are turned off for an off-time period when the level of the negative current exceeds the negative-over-current threshold.

3. The resonant flyback power converter as claimed in claim 1, wherein the current-sense device is a current-sense resistor; the current-sense resistor is configured to sense the level of the positive current and the level of the negative current.

4. The resonant flyback power converter as claimed in claim 1, wherein the positive current and the negative current are in inverse polarity.

5. The resonant flyback power converter as claimed in claim 1, wherein the second driving signal includes a minimum resonant period during a resonant cycle of the resonant flyback power converter; the minimum resonant period is decreased in response to the decrease of an output load, wherein the resonant cycle is related to a resonance of the resonant capacitor and the transformer.

6. The resonant flyback power converter as claimed in claim 1, further comprising a bias resistor; the bias resistor is coupled to the current-sense device for generating a current-sense signal; wherein the current-sense signal is configured to be compared with a first current threshold voltage for determining whether the positive current exceeds the positive-over-current threshold, and/or, to be compared with a second current threshold voltage for determining whether the negative current exceeds the negative-over-current threshold.

7. The resonant flyback power converter as claimed in claim 1, wherein during a DCM operation, the second driving signal further includes an off-time period which is started after the transformer is demagnetized; wherein the off-time period is increased in response to the decrease of an output load; wherein the first driving signal and the second driving signal are turned off during the off-time period.

8. The resonant flyback power converter as claimed in claim 1, wherein a pulse width of the second driving signal is decreased in response to the decrease of an output load.

9. A switching control circuit, configured to operably control a resonant flyback power converter, wherein the resonant flyback power converter includes a first transistor and a second transistor which are configured to form a half-bridge circuit; a current-sense device, coupled to the half-bridge circuit and configured to sense a primary switching current of the half-bridge circuit to generate a current-sense signal; and a transformer and a resonant capacitor which are connected in series and are coupled to the half-bridge circuit, wherein the first transistor and the second transistor are configured to switch the transformer and the resonant capacitor to generate an output voltage; wherein the switching control circuit comprises:

a magnetizing control circuit, configured to operably generate a first driving signal to switch the first transistor; and a resonant and ZVS control circuit, coupled to the magnetizing control circuit and configured to operably generate a second driving signal to switch the second transistor;

wherein during a turn-on period of the first driving signal, the switching control circuit controls the half-bridge circuit to generate a positive current of the primary switching current to magnetize the transformer and charge the resonant capacitor;

wherein during a turn-on period of the second driving signal, the switching control circuit controls the half-bridge circuit to generate a negative current of the primary switching current to discharge the resonant capacitor;

wherein the switching control circuit senses the current-sense signal to turn off the first transistor when a level of the positive current exceeds a positive-over-current threshold, and/or, to turn off the second transistor when a level of the negative current exceeds a negative-over-current threshold.

10. The switching control circuit as claimed in claim 9, wherein both the first driving signal and the second driving signal are turned off for an off-time period when the level of the negative current exceeds the negative-over-current threshold.

11. The switching control circuit as claimed in claim 9, wherein the current-sense device is a current-sense resistor; the current-sense resistor is configured to sense the level of the positive current and the level of the negative current.

12. The switching control circuit as claimed in claim 9, wherein the positive current and the negative current are in inverse polarity.

13. The switching control circuit as claimed in claim 9, wherein the second driving signal includes a minimum resonant period during a resonant cycle of the resonant flyback power converter; the minimum resonant period is decreased in response to the decrease of an output load, wherein the resonant cycle is related to a resonance of the resonant capacitor and the transformer.

14. The switching control circuit as claimed in claim 9, further comprising a bias resistor; the bias resistor is coupled to the current-sense device for generating a current-sense signal; wherein the current-sense signal is configured to be compared with a first current threshold voltage for determining whether the positive current exceeds the positive-over-current threshold, and/or, to be compared with a second current threshold voltage for determining whether the negative current exceeds the negative-over-current threshold.

15. The switching control circuit as claimed in claim 9, wherein during a DCM operation, the second driving signal further includes an off-time period which is started from the turn-off of the second driving signal; wherein the off-time period is increased in response to the decrease of an output load; wherein the first driving signal and the second driving signal are turned off during the off-time period.

16. The switching control circuit as claimed in claim 9, wherein a pulse width of the second driving signal is decreased in response to the decrease of an output load.

17. A method, configured to operably control a resonant flyback power converter, wherein the resonant flyback power converter includes a first transistor and a second transistor which are configured to form a half-bridge circuit; a current-sense device, coupled to the half-bridge circuit and configured to sense a primary switching current of the half-bridge circuit to generate a current-sense signal; and a transformer and a resonant capacitor which are connected in series and are coupled to the half-bridge circuit, wherein the first transistor and the second transistor are configured to switch the transformer and the resonant capacitor to generate an output voltage; wherein the method comprises:

generating a first driving signal to switch the first transistor; and generating a second driving signal to switch the second transistor;

wherein during a turn-on period of the first driving signal, the switching control circuit controls the half-bridge circuit to generate a positive current of the primary switching current to magnetize the transformer and charge the resonant capacitor;

wherein during a turn-on period of the second driving signal, the switching control circuit controls the half-bridge circuit to generate a negative current of the primary switching current to discharge the resonant capacitor;

wherein the switching control circuit senses the current-sense signal to turn off the first transistor when a level of the positive current exceeds a positive-over-current threshold, and/or, to turn off the second transistor when a level of the negative current exceeds a negative-over-current threshold.

18. The method as claimed in claim 17, wherein both the first driving signal and the second driving signal are turned off for an off-time period when the level of the negative current exceeds the negative-over-current threshold.

19. The method as claimed in claim 17, wherein the positive current and the negative current are in inverse polarity.

* * * * *